July 12, 1960
K. E. GANSKE ET AL
2,945,083
ELECTRIC TERMINAL AND METHOD OF MAKING THE SAME
Filed June 10, 1959
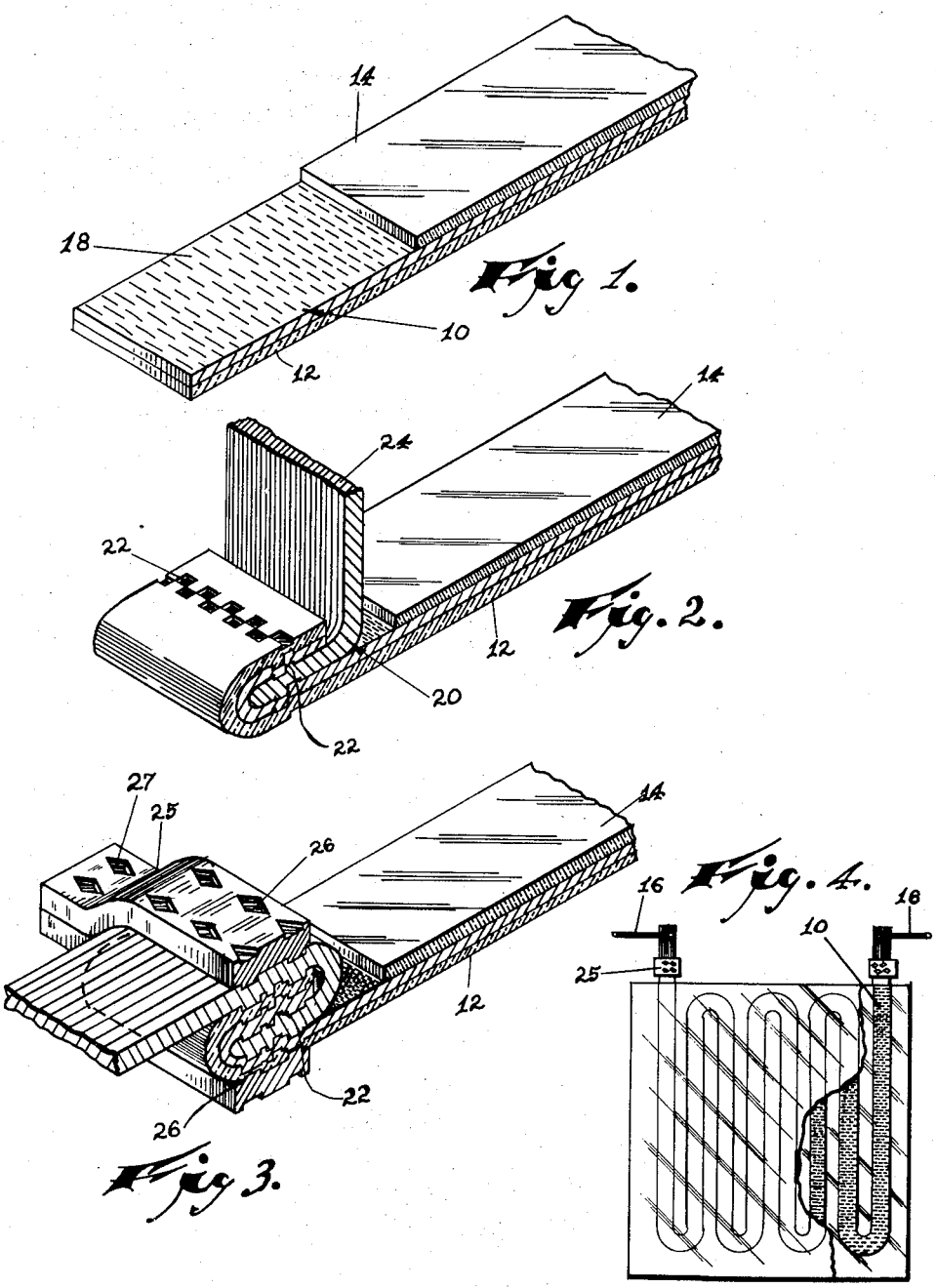
INVENTOR.
KINGSTON E. GANSKE &
BY RICHARD F. ANDERSON
ATTORNEYS.

United States Patent Office 2,945,083
Patented July 12, 1960

2,945,083

ELECTRIC TERMINAL AND METHOD OF MAKING THE SAME

Kingston E. Ganske and Richard F. Anderson, Columbus, Ind., assignors to Arvin Industries, Inc., Columbus, Ind., a corporation of Indiana Filed June 10, 1959, Ser. No. 819,403

3 Claims. (Cl. 174—68.5)

This invention relates to an electric terminal for a metallic foil grid and to a method of making the same.

It is an object of our invention to provide an electric terminal for a metallic foil grid which can be quickly and easily secured to said grid to provide a rigid connection therewith, which will be adapted to be connected to an electrical lead for said grid, and which will provide a conductive path between said lead and the grid.

Our invention is characterized by the provision of an electric terminal for a metallic foil grid of the type commonly laminated between a pair of sheets of insulating material. In forming our terminal on such a grid, the insulation is removed from the metallic foil adjacent an end thereof and said foil is bent over the end of a strip of conductive metal which is then bent over the foil, thus sandwiching one end of the metallic strip between a pair of the opposed foil faces, with the opposite end of the metallic strip extending outwardly therefrom for connection to an electric lead. The overlapping faces of the foil and metallic strip are crimped together to hold them in intimate contact and provide a rigid conductive joint between the metallic strip and the foil grid.

Preferably, additional rigidity and strength may be provided by disposing a metallic clip around the interconnection of the metallic strip and foil grid, and crimping said clip thereon.

The accompanying drawing illustrates our invention. In such drawing:

Fig. 1 is a fragmentary isometric view of one end of an insulated foil grid to which our terminal may be secured;

Fig. 2 is a fragmentary isometric view of a foil grid and showing a method of forming our terminal connection thereon;

Fig. 3 is a fragmentary isometric view of our terminal connected to a foil grid; and Fig. 4 is a side elevation of a foil heating grid with portions broken away and showing a pair of our electric terminals connected to said grid.

As illustrated in the drawing, our invention is adapted to provide an electrical connection for a metallic foil grid 10. Such grids are commonly used in radiant-heating panels, and as shown in Fig. 4, generally comprise a continuous length of a relatively low-resistance metal, such as aluminum, formed in narrow elongated strips which define a continuous sinuous conductive path. The foil used in such grids generally has a thickness in the range of from about .0003 inch to about .001 inch. Because of its extreme thinness, the foil is normally laminated between a pair of sheets 12 and 14 of flexible insulating material to insulate said grid and protect it against tearing or breaking. One such insulating material in common use is "Mylar" (polyethylene terephthalate).

The extreme thinness of the foil grid 10 makes it extremely difficult to solder the lead wires 16 to said grid. Our invention is thus concerned with the provision of an electric terminal for such foil grids. In forming one of our terminals, a portion of one of the sheets 12 or 14 is removed from the grid adjacent an end thereof to expose the end portion 18 of one face of the foil strip forming said grid. A strip 20 of a conductive material, conveniently copper, is then placed on the exposed end face 18 of the foil inwardly from the end thereof. The metallic strip 20 has a thickness substantially greater than the thickness of the foil forming the grid 10. The end 18 of the foil strip is then bent over the end of the metallic strip 20 to interpose one end of the metallic strip between a pair of faces of the foil and to provide a surface-to-surface contact between the ends of the metallic strip and the foil. With the ends of the foil and metallic strip disposed in an overlapping relationship, the several overlapping layers of metal and insulating material are crimped together to provide a plurality of interlocking deformations 22 in the adjacent faces of the foil and metallic strip. Desirably, the deformations 22 are arranged in a path extending transversely of the foil strip adjacent the center of the bent-over portion of said foil strip. Due to the extreme thinness of the foil, the deformations formed by the crimping operation will interlock the adjacent faces of the metallic strip and foil together in intimate contact to form a highly conductive joint. In forming the deformations 22 the metal in the adjacent faces of the foil and the metallic strip tends to flow together to form a cold-weld between said foil and the metallic strip, thereby increasing both the rigidity and conductivity of the connection. The metallic strip is then bent over the overlapping portions of said strip and the foil with its opposite end 24 projecting outwardly therefrom for connection to a lead wire 16.

Alternatively, the end of the metallic strip 20 may be bent back upon itself in a retroverted bend and inserted between the opposed faces of the retroverted bend in the foil prior to forming the deformations 22. In this manner, the deformations formed in the outer stretches of the retroverted ends of the metallic strip and the outwardly disposed sheet 12 extend through said strip and sheet to form corresponding interlocking deformations in the several overlapping layers of metal and insulation.

To give additional strength and rigidity to the terminal, a clip 25, conveniently formed of aluminum, is placed over the interlocking retroverted ends of the metallic and foil strips. As shown in Fig. 3, the clip is formed from a strip of metal bent around the retroverted ends of the strips 24 and 10 with its ends crimped together, as at 27. The clip is also crimped onto the terminal connection by a pair of rows of interlocking deformations 26 disposed on either side of the deformations 22. The deformations 27 and 26 formed in the clip interlock and cold-weld the ends of the clip together, and interlock and cold-weld said clip to the outer stretches of the metallic strip 20 and the insulating strip 12 for rigidly interlocking the several overlapping layers together.

While we have described our terminal as being connected to a foil grid laminated between a pair of sheets of insulating material, it is to be understood that our terminal may be connected to a foil grid in the manner described irrespective of the presence of such insulating sheets.

We claim as our invention:

1. An electric terminal for a foil grid of the type comprising a thin strip of metallic foil, comprising a metallic strip of greater rigidity than the foil and having a retroverted end interlockingly received in an oppositely retroverted end of the foil strip, the retroverted end of said metallic strip having a surface-to-surface contact with a pair of faces on the retroverted end of the foil strip, the opposite end of said metallic strip extending outwardly beyond the interlocking ends of said metallic and foil strips, and a plurality of interlocking deformations formed in the interlocking ends of said strips to rigidly hold the same together, wherein said foil grid is interposed between a pair of sheets of insulating material with one of said sheets being removed from the retroverted end of said grid and the other of said sheets being interposed between one face of said foil strip and the metallic strip.

2. A method of making an electric terminal for a foil grid of the type comprising a thin continuous strip of metallic foil interposed between a pair of sheets of insulating material, comprising the steps of removing a portion of one of said sheets of insulating material adjacent an end of the foil strip, bending the exposed end of said foil strip into a retroverted bend, bending an end of a metallic strip having a rigidity greater than the foil strip into an oppositely curved retroverted bend and inserting the same between the opposed faces on the retroverted end of the foil strip, forming a first set of interlocking deformations in the interlocking retroverted ends of said strips for rigidly holding the same together in surface-to-surface contact, wrapping a clip around the overlapping end portions of said metallic and foil strips, and forming a second set of interlocking deformations in said clip for interlocking said clip to said strips.

3. The method as set forth in claim 2 in which said first and second sets of deformations extend transversely of the strips, and said second set of deformations are disposed on either side of said first set of deformations.

References Cited in the file of this patent

UNITED STATES PATENTS

| | | |
|---|---|---|
| 410,217 | Stone | Sept. 3, 1889 |
| 2,091,920 | Godsey | Aug. 31, 1937 |
| 2,225,801 | Schnoll | Dec. 24, 1940 |

FOREIGN PATENTS

| | | |
|---|---|---|
| 678,610 | Great Britain | Sept. 3, 1952 |